United States Patent [19]

Yoda

[11] Patent Number: 5,016,489
[45] Date of Patent: May 21, 1991

[54] MULTIARTICULATION ROBOT

[75] Inventor: Akira Yoda, Yokohama, Japan

[73] Assignee: Tokyo Sharyo Seizo Kabushiki Kaisha, Yokohama, Japan

[21] Appl. No.: 425,576

[22] Filed: Oct. 23, 1989

[30] Foreign Application Priority Data

Oct. 24, 1988 [JP] Japan .................. 63-138384[U]

[51] Int. Cl.⁵ .............................. B25J 18/00
[52] U.S. Cl. ........................ 74/479; 901/22; 901/23; 901/28
[58] Field of Search ............. 74/479; 901/22, 23, 901/24, 28

[56] References Cited

U.S. PATENT DOCUMENTS

| | | | |
|---|---|---|---|
| 4,626,165 | 12/1986 | Nakashima et al. | 901/23 X |
| 4,738,576 | 4/1988 | Eberle et al. | 901/23 X |
| 4,797,061 | 1/1989 | Munakata | 901/23 X |
| 4,921,393 | 5/1990 | Andeen et al. | 901/24 X |

Primary Examiner—Allan D. Herrmann
Attorney, Agent, or Firm—Bauer & Schaffer

[57] ABSTRACT

A multi-articulation robot formed of a plurality of rotary articulation mechanisms, rocking articulation mechanisms, rotary shafts and vertical rods so that the above mentioned rotary articulation mechanisms, rocking articulation mechanisms and rotary shafts may be sequentially controlled to move to any predetermined position a working attachment provided at the tip.

3 Claims, 2 Drawing Sheets

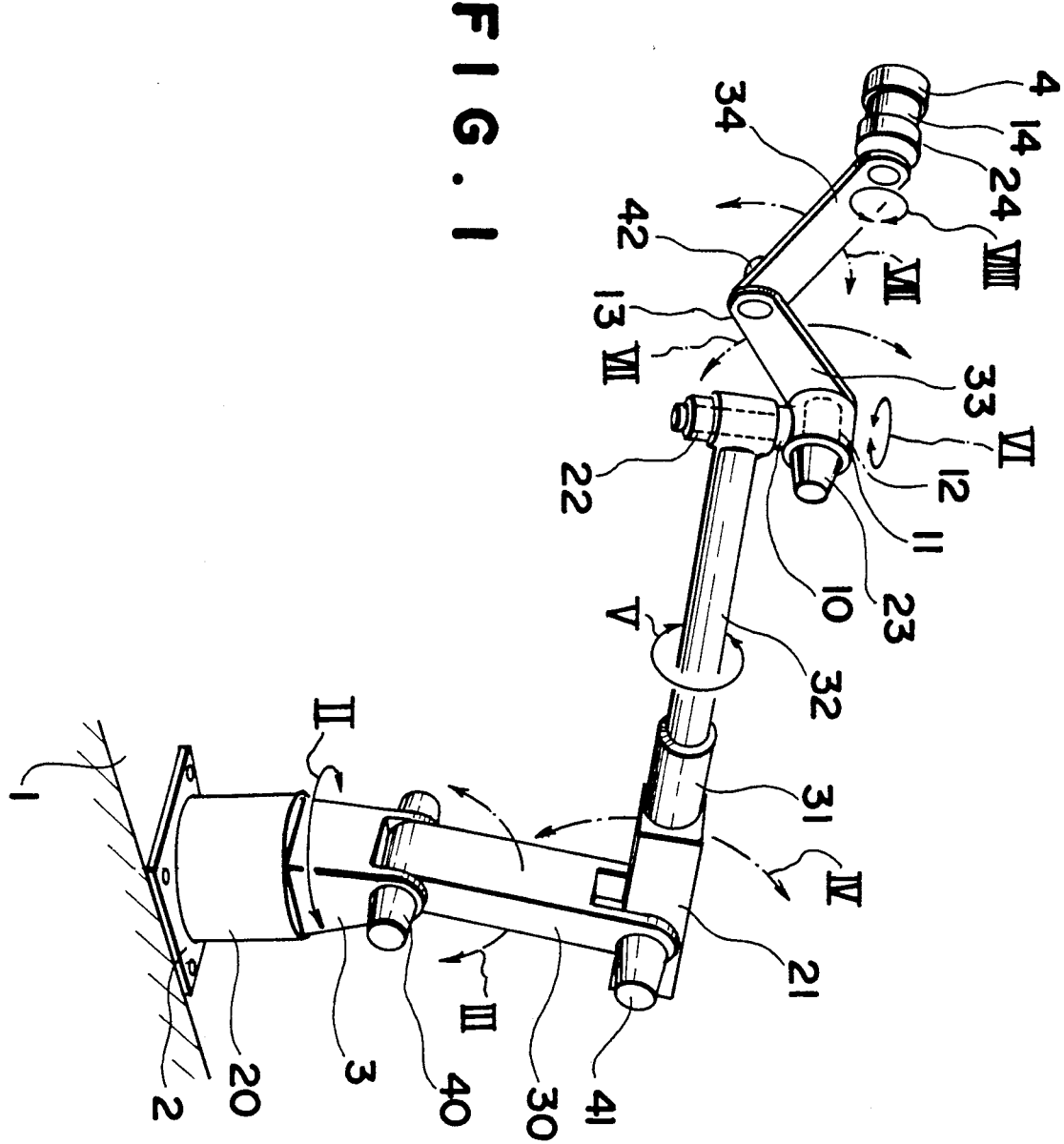

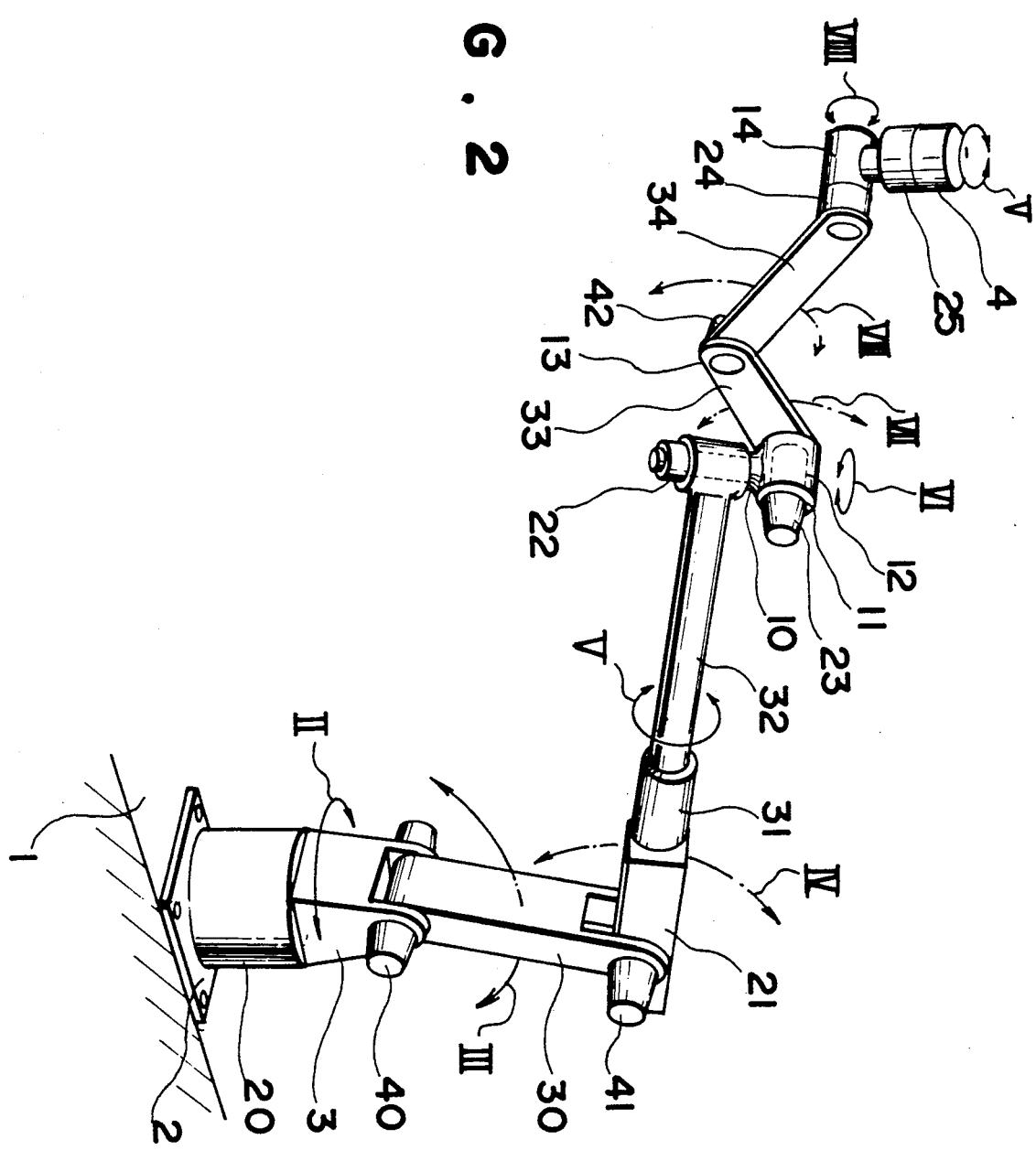

5,016,489

MULTIARTICULATION ROBOT

FIELD OF THE INVENTION

This invention relates to a multiarticulation robot which can enter and repair an existing structure or building and which can be extended to reach a high place.

BACKGROUND OF THE INVENTION

Existing structures are usually encumbered by wide and complicated spaces in which pillars, girders, and beams are interposed from below ground up to the ceiling.

It has been conventional to employ robots, which are large and heavy in their respective structural parts but which have few extending arms, to work within such wide spaces. Such conventional robots have been so limited in the vertical and horizontal operating ranges that they require frequent relocation as a whole within the space of the structure or building. This is disadvantageous as such movement requires delicate handling least the robot be harmed.

Also, in the conventional working robot, the arms forming the respective structural parts have been large and heavy. As it is necessary to simultaneously drive the respective arms, a plurality of large servomotors or the like as well as a large controlling electric power source are required. Therefore, the price of the robot itself is very high.

Further, in operation not only must the operator must be very experienced, but excessive electric power must be used for the operation to control such large structures, which results in a very high operating cost.

BRIEF SUMMARY OF THE INVENTION

According to the present invention, a multiarticulation robot, having a wide vertical and horizontal operating range, is simplified by making the respective parts separately driven. Consequently, the controlling electric power source to drive each part is small, avoiding the need for large, expensive servomotors, and enables the construction and operation of the robot to be inexpensive and economical.

BRIEF DESCRIPTION OF THE DRAWINGS

The drawings show embodiments of the present invention.

FIG. 1 is a general perspective view of one embodiment.

FIG. 2 is a general perspective view of another embodiment.

DETAILED DESCRIPTION OF THE PREFERRED EMBODIMENTS

The embodiments of the present invention shall be explained in detail, in the following, with reference to the drawings.

In FIG. 1, the multiarticulation robot comprises a pedestal 2, providing a base fixed on the floor 1 in an existing structure or building. Mounted on the pedestal 2 is a stand 3 which is rotatable in the directions indicated by the double arrow II by a first rotary articulation mechanism 20. A first vertical arm 30 is pivoted at one end at the top of the stand 3 and is inclinable in the directions indicated by the double arrow III by a first rocking articulation mechanism 40. A second rocking articulation mechanism 41, provided at the tip of the first vertical arms 30, pivotally supports a second rotary articulation mechanism from which extends a second vertical arm 31. The second rocking articulation mechanism 21 and the second vertical arm 31 are movable jointly in the directions indicated by the double arrow IV.

A third vertical arm 32, having a first rotary shaft 10 mounted at its outer end, is provided to extend the second vertical arm 31 and is rotatable in the directions indicated by the double arrow V by the second rotary articulation mechanism 21. The third vertical arm 32 is provided at its tip with a first rotary shaft 10 driven by a third rotary articulation mechanism 22 to rotate the first rotary shaft 10 in the directions indicated by the double arrow VI. Further, a sleeve 11, mounted at the tip of the first rotary shaft 10, journals a second rotary shaft 12 movable by a third rotary articulation mechanism 23. Fixed at the end of the second rotary shaft 12 is a fourth vertical arm 33 which is thus pivotal in the directions indicated by the double arrow VII. The fourth vertical arm 33 is provided at its tip 13 with a fifth vertical arm 34 pivotal in the directions indicated by the double arrow VIII by a third rocking articulation mechanism 42. A fifth rotary articulation mechanism 24 is journalled at the tip of the arm 34. Extending from the arm 34 is a third rotary shaft 14 rotatable in the directions indicated by the double arrow VIII. Fixed to the third rotary shaft 14 is a fixture 4, comprising itself a work tool or an attachment to which the work tool may be secured and which can be operated to move vertically and horizontally to cooperative functioning of the arms and mechanisms described.

FIG. 2 shows another embodiment of a multiarticulation robot of the present invention. In this figure, the same reference numerals as in FIG. 1 represent the same members. However, here a sixth rotary articulation mechanism 25 is fixed at right angles to the third rotary shaft 14 and is rotatable in the directions indicated by the double arrow V. The working attachment 4 is fixed to the mechanism 26 to effect the selected work.

As mentioned above, in the present invention the attachment 4 for performing such work as welding or grinding is fitted to the third rotary shaft 14 or to the sixth rotary articulation mechanism 25 (FIG. 2).

By selectively operating each of the first rotary articulation mechanism 20, first rocking articulation mechanism 40, second rotary articulation mechanism 21, the second rocking articulation mechanism 41, second vertical arm 31, third vertical arm 32, third rotary articulation mechanism 22, and fourth rotary articulation mechanism 23, the attachment 4 can be placed in space at any cubic angle to the ground. Thereafter, the working attachment 4 is rotated and controlled at the tip of the fifth vertical arm 34 through the fOurth vertical arm 33 fixed to the second rotary shaft 12 and third rocking articulation mechanism 42.

The present invention is formed of a plurality of separately actuated rotary articulation mechanisms, rocking articulation mechanisms, rotary shafts, and vertical rods so that the working attachment 4 may be freely moved by selective synchronism of these mechanisms tO any predetermined position as described. That is to say, even within a wide and complicated space in which pillars, girders, and beams are interposed, the rotary articulation mechanisms, rocking articulation mechanisms, and rotary shafts are not simultaneously operated but are sequentially operated to be able to move the robot to any necessary position.

What is claimed is:

1. A multiarticulation robot comprising a rotatable stand; a first rotary articulation mechanism for rotating said stand; a first arm pivotally journalled on said stand; a first rocking articulation mechanism for rocking said first arm; a second arm pivotally mounted at the opposite end of said first arm; a second rocking articulation mechanism for rocking said second arm; a third arm slideably extending from said second arm; a second rotary articulation mechanism for rotting said third arm; a first shaft rotatably mounted at the end of said third arm at an axis intersecting the axis of said third arm; a third rotary articulation mechanism for rotating said first shaft; a second shaft rotatably mounted at the end of said first shaft at an axis intersecting, at right angles, said first shaft; a third rocking articulation mechanism for rocking said second shaft about an axis; a fourth arm mounted on said second shaft and conjointly rocking therewith; a third shaft mounted at the end of said fourth arm, having an axis extending transversely to the plane in which said fourth arm rocks; a fourth rocking articulation mechanism for rocking said third shaft; a fifth arm mounted at one end to said third rotary shaft and conjointly rocking therewith; a fourth rotary shaft mounted at the end of said fifth rm, having an axis extending transversely to the plane in which said fifth arm rocks; a fourth rotary articulation mechanism for rotating said fourth shaft.

2. The robot according to claim 1 including a fixed base, said rotary stand being mounted on said fixed base.

3. The robot according to claim 1, including work performing means mounted at the end of said fourth rotatable shaft.

* * * * *